April 16, 1963
M. SKUMAWITZ
3,085,712
AUTOMATIC VENDING MACHINES
Filed Feb. 15, 1960
9 Sheets-Sheet 1
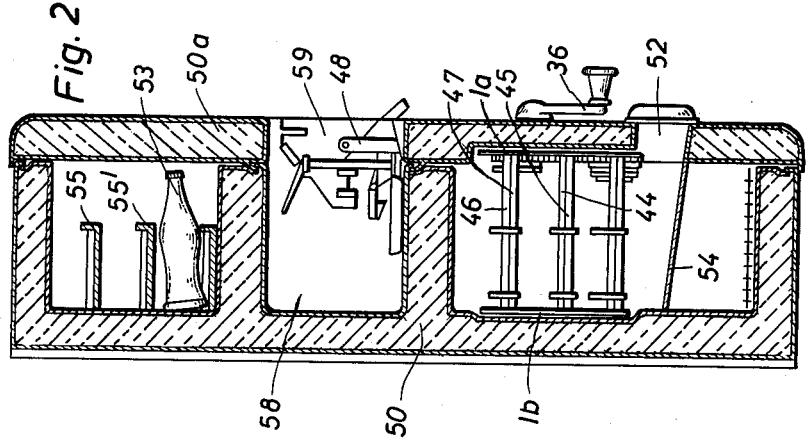
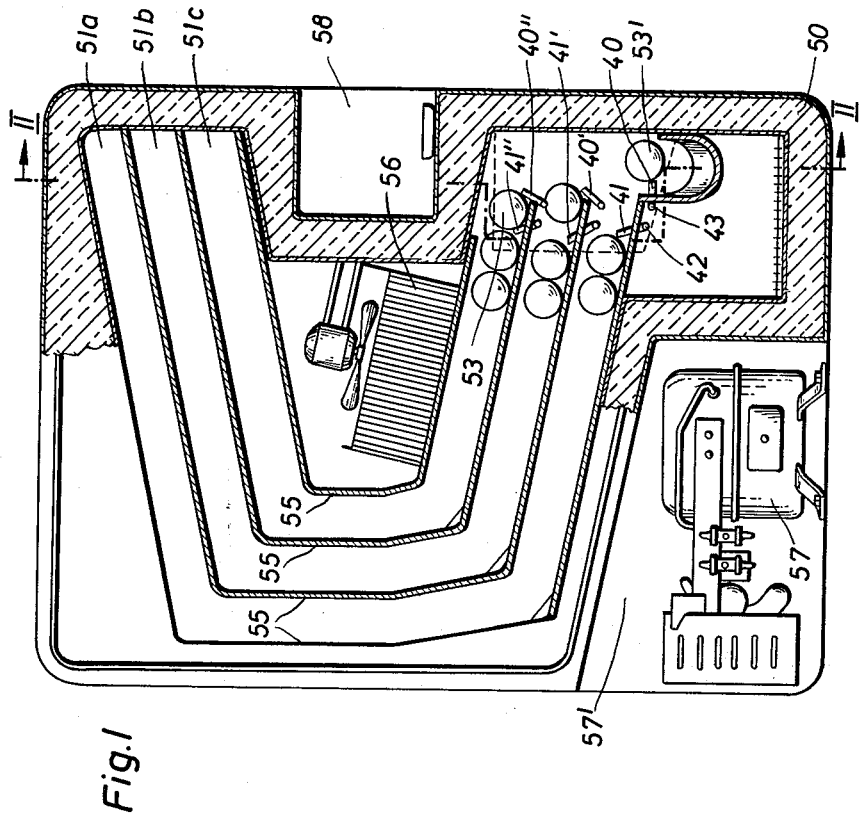
INVENTOR
MAX SKUMAWITZ
BY
Mestern & Kollin,
ATTORNEYS

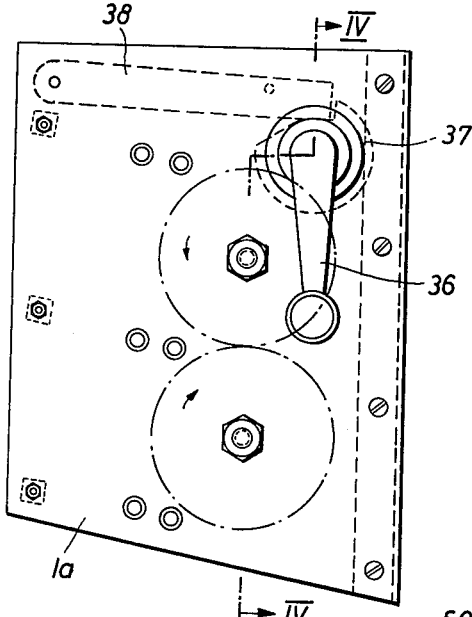
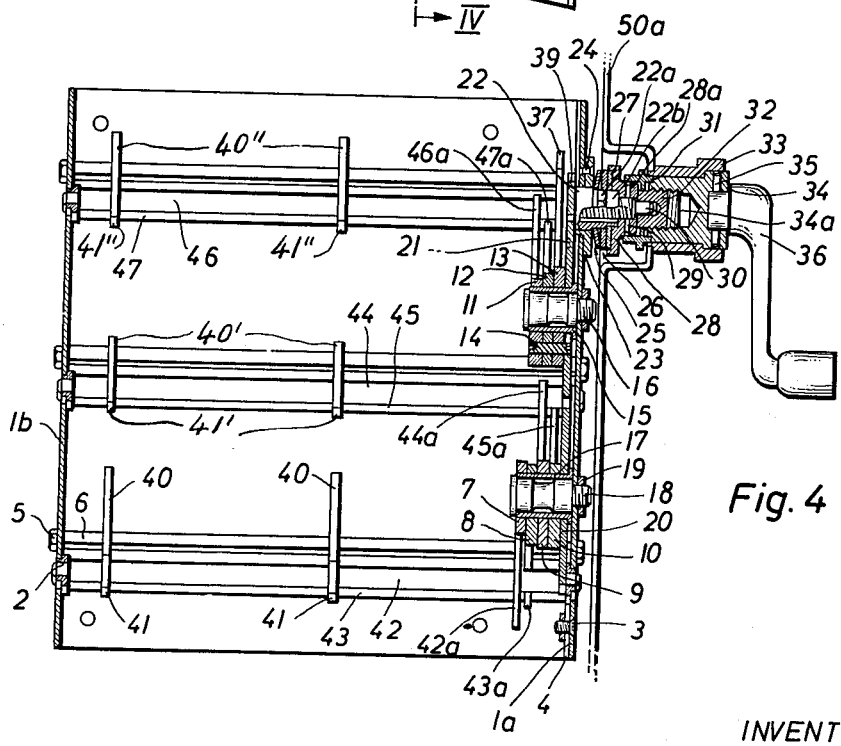

April 16, 1963 M. SKUMAWITZ 3,085,712
AUTOMATIC VENDING MACHINES
Filed Feb. 15, 1960 9 Sheets-Sheet 3

INVENTOR
MAX SKUMAWITZ
BY
Mestern & Rollin,
ATTORNEYS

April 16, 1963  M. SKUMAWITZ  3,085,712
AUTOMATIC VENDING MACHINES
Filed Feb. 15, 1960
9 Sheets-Sheet 4
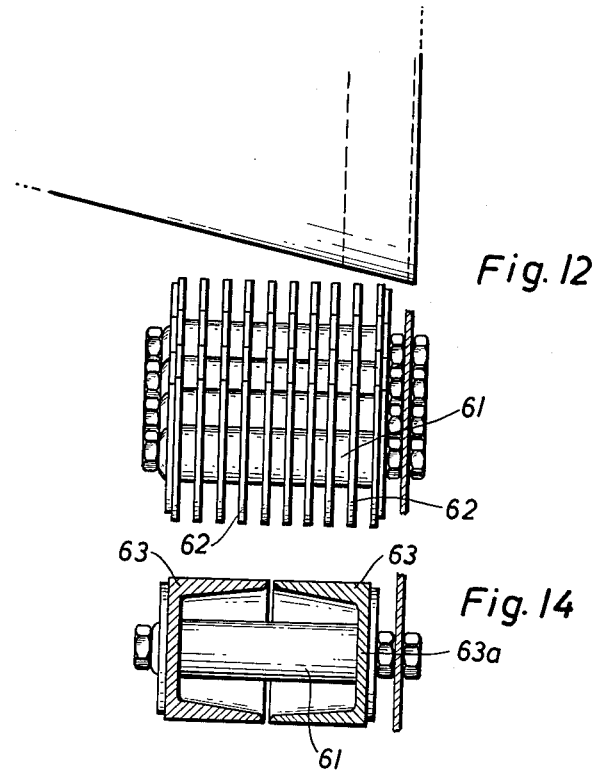
Fig. 12
Fig. 14
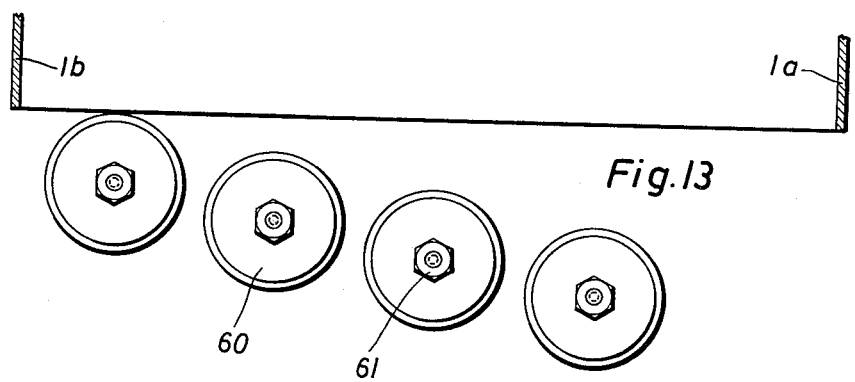
Fig. 13
INVENTOR
MAX SKUMAWITZ
BY
Mestern, & Kollin.
ATTORNEYS April 16, 1963  M. SKUMAWITZ  3,085,712
AUTOMATIC VENDING MACHINES
Filed Feb. 15, 1960  9 Sheets-Sheet 5
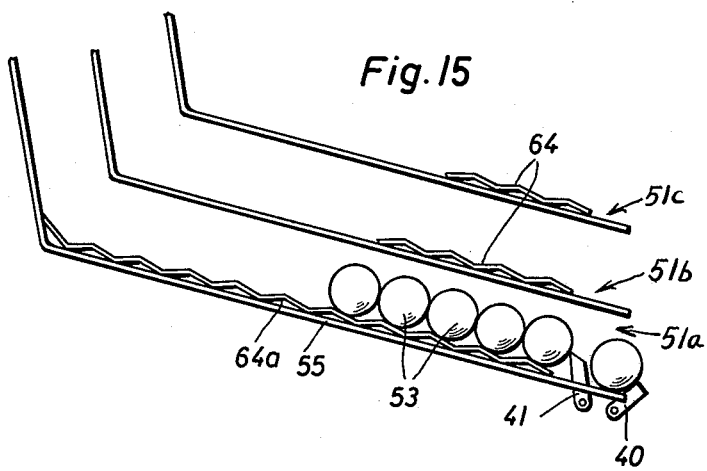
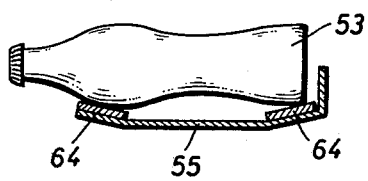
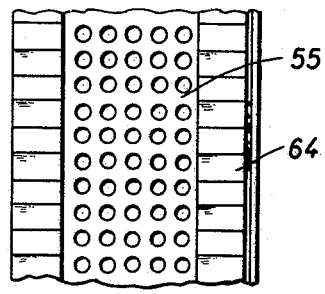
INVENTOR
MAX SKUMAWITZ
BY
Mestern & Rollin,
ATTORNEYS

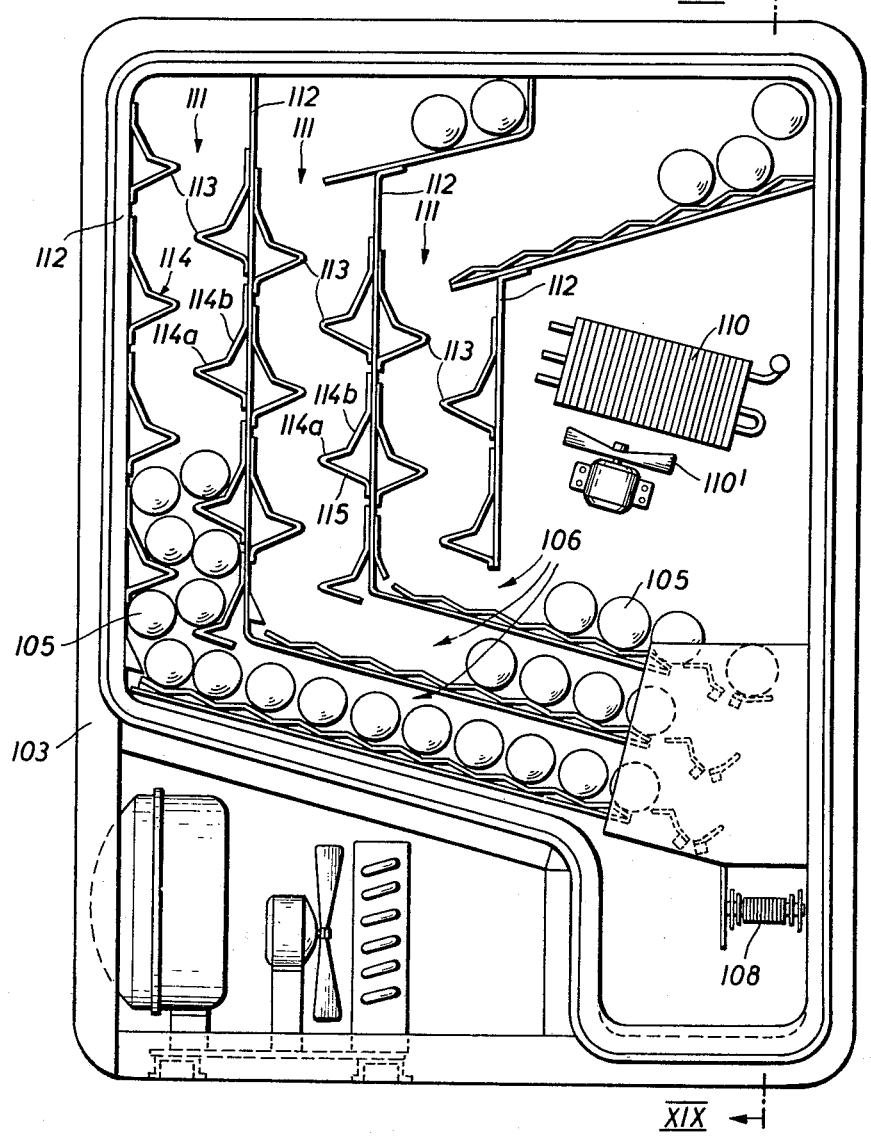

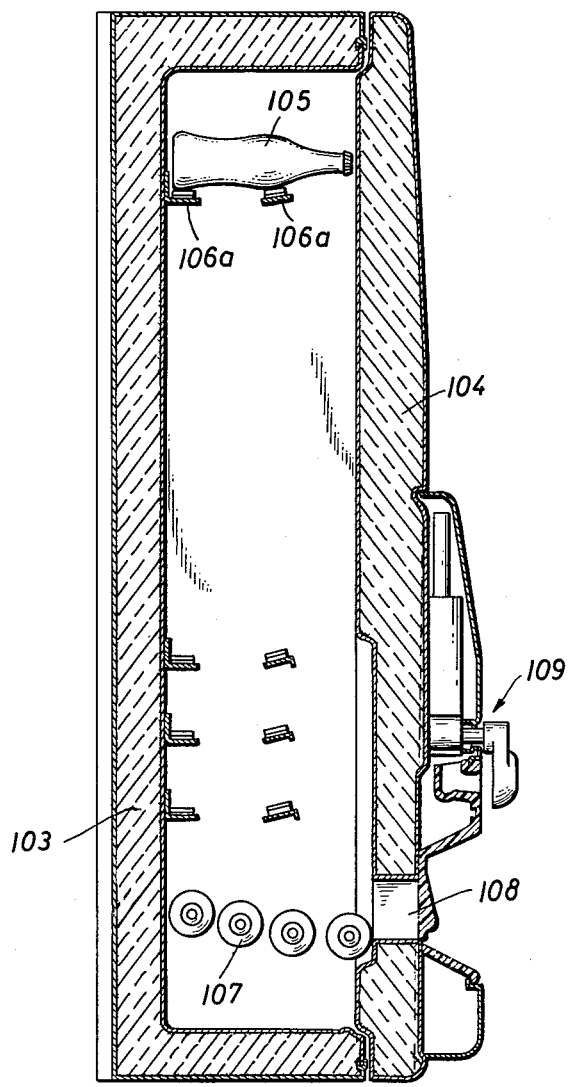

April 16, 1963   M. SKUMAWITZ   3,085,712
AUTOMATIC VENDING MACHINES
Filed Feb. 15, 1960   9 Sheets-Sheet 8

INVENTOR
MAX SKUMAWITZ
BY
Mestern & Rollin
ATTORNEYS

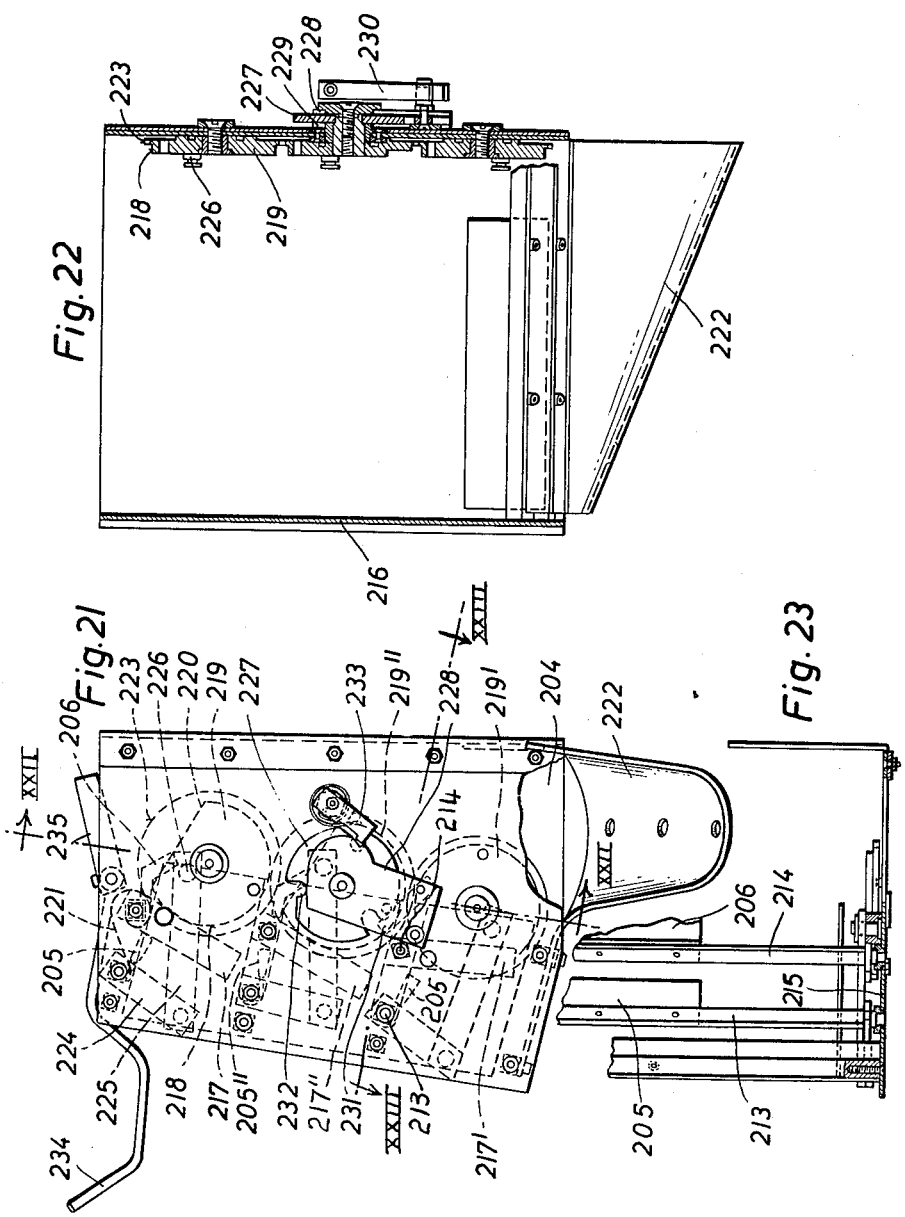

United States Patent Office 3,085,712
Patented Apr. 16, 1963

3,085,712
AUTOMATIC VENDING MACHINES
Max Skumawitz, Angermunder Strasse 44, Lintorf,
Bezirk Dusseldorf, Germany
Filed Feb. 15, 1960, Ser. No. 8,750
Claims priority, application Germany Feb. 20, 1959
3 Claims. (Cl. 221—150)

The invention relates to a bottle-vending machine which contains a number of conveyor channels directed towards the opening where the bottles are delivered. These conveyor channels are intercepted by a number of locking devices which are operated by a locking gear which delivers the bottles one at a time from the conveyor channel.

A disadvantage of the known automatic vending machines of the above type is that the bottles are not removed evenly from all the channels so that there are always a few left behind when the machine is refilled, the result being that the contents finally become bad. For example in one known type of bottle vending machine the bottles are arranged in two concentric circular paths with the outlet at the bottom. The bottles of each semicircular half of the inner path cannot be removed until the outer path is completely empty. If, therefore, the machine is refilled before the outer path is completely empty, the bottles in the inner path will remain there. In addition, it may happen that the bottles are removed from only one side of the two concentric paths, the other side remaining partly or completely full. This may also lead to a residue of bottles remaining in the machine for a long time.

These difficulties are overcome in the machine according to the invention, which comprises a plurality of inclined conveyor channels for bottles, a delivery opening at the lower ends of the conveyor channels, a locking means associated with each channel serving to hold the bottles in place and so arranged that upon disengagement it releases only one bottle from the associated channel, and cyclically operating control means whereby the locking means associated with the different channels are disengaged to release bottles from the channels in cyclic sequence. This ensures that there will be no residual bottles left behind in the machine if the latter is recharged a number of times before being completely emptied. As the fresh bottles are placed behind the ones still in the machine and it is always the lowest bottles in each path which are discharged in a cyclic sequence, the fresh ones can be delivered only after all the other bottles have been removed.

According to a preferred form of construction of the automatic vending machine according to the invention, the locking means at the bottom of the delivery paths consist of two groups of locking levers which are fixed to separately mounted rocking shafts; one group of locking levers effects the delivery of the lowest bottle in the path and the other group ensures that the following bottles will not roll down until the first group has been swung back into the locking position. The rocking shafts may be driven by associated cam followers which cooperate with synchronously rotating cams of the control means which either are appropriately different from one another in construction or are in a staggered arrangement. Preferably, however, at least the locking levers which control the passage of the bottles towards the outlet are connected with a disc provided in the control means each by way of a system of links forming a crank mechanism. It is also advantageous to arrange each locking lever above its associated delivery channel so that it projects into this channel from above, as this ensures a smoother and more even movement of the bottles along their path. The locking mechanism preferably consists of a manually operated toothed-wheel transmission which synchronously drives the cams or control discs. Further, to ensure that the bottles will follow along their path inside the machine, it is important to make the vertical part of the channel wide enough to accommodate at least two bottles side by side and to provide arresting means such that the bottles will be guided along a zig-zag or wavy path. Finally, to ensure efficient cooling of the stored bottles, the delivery channels are made of narrow strips to allow free circulation of air through the machine, and the evaporator and fan of the cooling device are so arranged that the cooling current of air issuing from them strikes the bottles lying at the end of the path which are the ones to be delivered next.

In order that the invention may be more clearly understood several embodiments of it will now be described with reference to the accompanying drawing, in which:

FIGURE 1 is a side-elevational view, partly in section, showing an automatic vending machine according to the invention with the door removed;

FIGURE 2 is a section on the line II—II of FIGURE 1;

FIGURE 3 is an elevational view of a partition on which the locking mechanism is arranged in the machine shown in FIGURES 1 and 2, and which is covered by the door;

FIGURE 4 is a section on the line IV—IV on FIGURE 3 of the locking mechanism;

FIGURES 12 and 13 are front-and side-elevational views, respectively, showing an inclined chute made of rollers, for the bottles about to be delivered;

FIGURE 14 is a cross-sectional view illustrating a modification of a roller for the chute shown in FIGURE 13;

FIGURES 15 to 17 show the lower ends of the channels for the bottles in side view, in section and in plan view, respectively;

FIGURES 18 and 19 show an alternative automatic vending machine also according to the invention, in front view, with the door removed, and in section on the line XIX—XIX of FIGURE 18, respectively;

FIGURE 21 shows the associated locking transmission together with the locking levers arranged at the lower ends of the channels in a sectional view corresponding to FIGURE 20 but on an enlarged scale.

FIGURES 22 and 23 are respectively a section of a top view taken on the lines XXII—XXII and XIII—XXIII in FIGURE 21.

Figure 5:
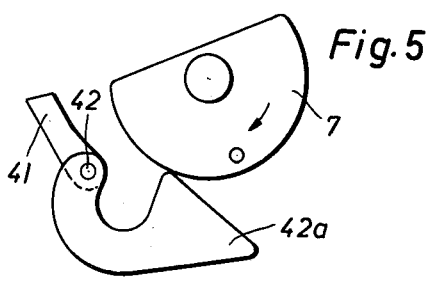
FIGURES 5 to 10 are elevational views showing the cam discs included in the locking mechanism, and the cam followers and locking levers cooperating with them, in different relative positions.

The bottle-vending machine shown in FIGURES 1 to 17 has a box-shaped housing 50 which may be closed by the door 50a as shown in FIGURE 2. The housing and the door are lined in the usual manner with an insulating layer. The channels for the bottles extend over practically the entire width of the machine and are bent at angles once or several times along their length. In the example shown, three such channels 51a, 51b, and 51c are provided which, as shown in FIGURE 1, are bent in the form of a V. Alternately, the channels may be bent several times; for example in very tall machines they may be S-shaped. In that case, the opening 52 at which the bottles are removed would be provided on the left-hand side of the door. The lower ends of the channels are arranged one above the other and a common chute 54 slopes down from the channels to the opening for the removal of the bottles. The locking means 40, 40', 40" and 41, 41', 41" for the bottles, arranged at the bottom of the channels, and their control means are described below.

The channels may be made, in the usual manner, of perforated metal plates 55. The space enclosed by these plates contains the evaporator and fan 56 of a cooling plant, of which the motor 57 together with the compressor are in the lower space 57' which is enclosed above by the inclined channels (FIGURE 1). If the channels are bent a number of times along their course, a correspondingly larger number of cooling units 56 may be provided; in the case of S-shaped channels, for example, two such units may be provided. In the example shown in FIGURES 1–17, a space 58 enclosed by a layer of insulating material and open to the door is provided at the level of the cooling unit 56. This space contains a device 59, shown in FIGURE 2, for inserting coins and returning change, which cooperates with a control device, to be described hereinafter, for the locking means provided at the bottom of the conveyor channels. The conveyor channels have a raised edge 55' to prevent the bottles 53 which rest on them from dropping out when the door 50a is opened. The edge 55' preferably consists of a rubber section which tapers towards the top. Therefore, only the bottom of each bottle is in contact with the channel and the side of the bottle rests on the rubber section, as shown in FIGURE 2, so that the bottles will roll noiselessly along their path when one bottle is removed from the machine.

Locking means for the bottles 53 are provided at the lower ends of the conveyor channels 51. According to the invention, these locking means are controlled by an externally actuated locking mechanism in such a manner that the lowest bottles in the channels are delivered in succession in a predetermined cyclic sequence. In the example shown in FIGURES 1–17, the locking means disposed at the bottom of each conveyor channel 51a, 51b, 51c consists of two pairs of locking levers 40—41, 40'—41' and 40"—41" which are fixed to separately mounted rocking shafts 42, 44, 46 and 43, 45, 47 as shown in FIGURE 4. The locking levers 40, 40', 40" effect the delivery of the lowest bottle in each channel and the locking levers 41, 41', 41" ensure that the other bottles will not follow along the channel until the associated locking lever 40, 40', 40" has been swung back into the locking position. The drive for the rocking shafts 42 to 47 is effected by cam followers 42a to 47a, mounted on these shafts, which cooperate with synchronously rotating cams of the locking mechanism and which are either of different shapes or in a staggered arrangement with respect to one another. The locking mechanism in the present case includes a toothed-wheel transmission or gear train 20, 21, 39 which is actuated by the hand crank 36. This mechanism and its cooperation with the locking means will be described in detail with reference to FIGURES 3 to 11.

The toothed-wheel transmission and the locking means controlled by it are arranged between two parallel wall plates 1a and 1b, the position of which in the housing 50 can be seen in FIGURE 2. The plates 1a and 1b are connected together by rods 6 in FIGURE 4 on which the plates are fixed by means of nuts 5. A reinforcing strip 4 is fixed on the plate 1a by means of screws 3. The rocking shafts 42, 43, 44, 45, 46 and 47, on which the locking levers 40, 40', 40" and 41, 41', 41" are mounted in pairs, are rotatably mounted in bearings 2 in the plates 1a and 1b. Near the right-hand end of the rocking shafts, as shown in FIGURE 4, cam-follower levers 42a, 43a, 44a, 45a, 46a and 47a are rigidly fixed to them. These cam levers cooperate with cams 7, 8, 9, 10, 11 and 12 of the locking mechanism and thereby rock the rocking shafts, as will be hereinafter described.

The cams 7, 8, 9 and 10, which cooperate with the levers 42a, 43a, 44a and 45a, are rotatably mounted, together with a toothed wheel 20, on a sleeve 17 which is seated on a bolt 18 and is fixed in the plate 1a by means of the nut 19. The cams 7 to 10 and the toothed wheel 20 are connected together by means of a pin, so that they can only rotate in unison on the sleeve 17. The cams 11 and 12 which cooperate with the cam follower levers 46a and 47a, together with a spacer washer 13 and a toothed wheel 21 which meshes with the toothed wheel 20, are mounted on a sleeve 15, and the cams 11 and 12 are connected by means of a pin 14 with the toothed wheel 21 in such a manner that they can rotate only in unison with the latter on the sleeve 15. The sleeve 15 is seated on a bolt 16 which, like the bolt 18, has a threaded end passing through the plate 1a, and the sleeve 15 is also fixed to the plate 1a by a nut screwed on to the threaded end. The toothed wheel 21 is in engagement with a driving wheel 39 which may be driven by the hand crank 36 mentioned above. In the example shown, a transmission ratio of 3:1 is provided, so that when the toothed wheel 39 undergoes one revolution, the toothed wheels 20 and 21, which are of the same size, are rotated through only one third of their circumference.

The driving wheel 39 is rigidly connected to a locking disc 37 (FIGURES 4 and 11) which is secured against rotation by a locking lever 38. The locking lever 38 is held in the locking position shown in FIGURE 11 by means of a rod 48 which is in communication with the coin insertion device 59. When a coin is inserted, the rod 48 is released from the device 59 so that the driving toothed wheel 39 can be rotated clockwise by operating the hand crank 36; the locking disc 37 then pushes the locking lever 38 and the rod 48 upwards. It is also possible to combine this with a mechanism for giving change. After a complete rotation of the toothed wheel 39 and therefore of the locking disc 37, the locking lever 38 and the rod 48 return to the position shown in FIGURE 11, in which the rod 48 is again locked against raising by the coin insertion device. Rotation of the locking disc 37 and the toothed wheel 39 in the anticlockwise direction is prevented by the shoulder 37a of the locking disc, against which the locking lever 38 bears.

The control means for the locking levers 40, 40', 40" and 41, 41', 41", which is operated when the toothed-wheel transmission 39—21—20 is actuated by means of the hand crank 36, will be described in detail below. In FIGURE 1, the locking levers are shown in a position in which a bottle 53' from the lower end of the channel 51a has just been released for delivery to the opening 52 by turning the locking levers 40 to the right. The bottles in the channel 51a behind this bottle are prevented from rolling along the channel by means of the locking levers 41 associated with this channel. The lowest bottle in the channels 51b and 51c is held in position by the associated locking levers 40' or 40".

Figure 6:
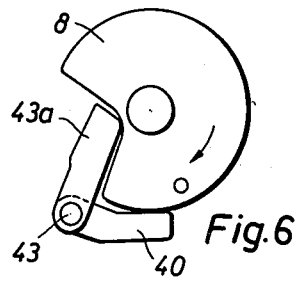

In FIGURES 5 to 10, the locking levers 40, 41', 40" and 41, 41', 41" associated with the channels 51a, 51b and 51c are shown in the same position as in FIGURE 1, together with the rocking shafts 42 to 47, cam follower levers 42a to 47a and cams 7 to 12. When the rod 48 is released by inserting a coin into the device 59, the toothed driving wheel 39 of the gear train can execute one complete clockwise rotation under the action of the hand crank 36. The toothed wheel 21 together with the cams 11 and 12 are thereby rotated anticlockwise through 120° and the toothed wheel 20 with the cams 7 to 10 are rotated through 120° in the clockwise direction. The direction of rotation of the cams is shown by arrows in FIGURES 5 to 10. The following rocking movements of the locking levers 40, 40', 40" and 41, 41', 41" are thereby brought about by the rocking shafts 42 to 47 and the cam follower levers 42a to 47a. In the conveyor channel 51a, the levers 40 are raised into the locking position while the levers 41 remain in their position of locking (FIGURES 5 and 6).

Figure 7:
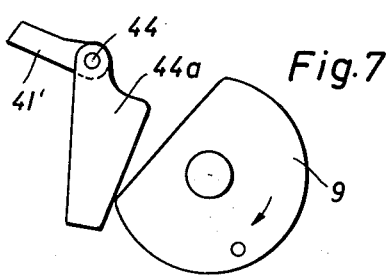
Figure 8:
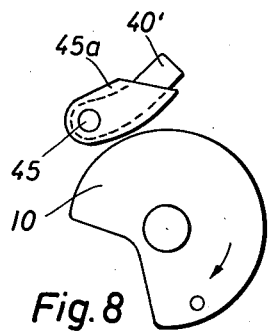
Figure 9:
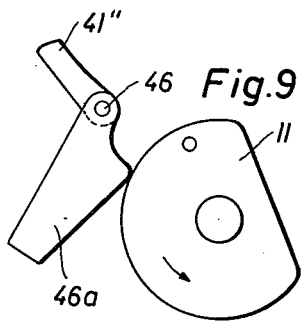
Figure 10:
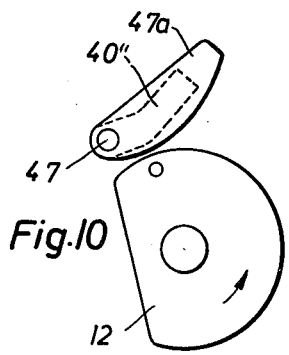
Figure 11:
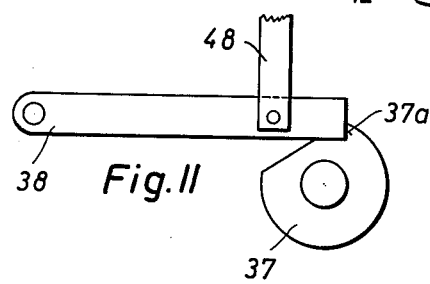
FIGURE 11 is an elevational view of a locking device for the mechanism.

In the channel 51b, the levers 40' are swung down during the second half of the 120° rotation of the cam 10, so that the lowest bottle 53 of this channel drops onto the chute 54 and can be conveyed to the delivery opening 52 (FIGURE 8). The levers 41' are then raised a little further and brought to their final locking position (FIGURE 7). In the channel 51c, the levers 40" remain in their position of locking (FIGURE 10), while the levers 41" are lowered slightly (FIGURE 9). It must be remembered at this point that there is no bottle on the levers 40" of this conveyor channel, because it has already been removed during the previous operation.

As already explained, the entire gear train is secured against further rotation, after each complete rotation of the toothed driving wheel 39, by engagement of the locking lever 38 in the locking disc 37 and by immobilization of the rod 48 by the coin-insertion mechanism. It is only after insertion of another coin that the toothed wheel 39 is again released for another rotation. When this is done, and the toothed wheel 39 is further rotated once in the clockwise sense by suitable operation of the hand crank 36, the locking levers 40, 40', 40" and 41, 41', 41" execute the following rocking movements. The levers 40 of the channel 51a remain in the locking position while the associated levers 41 are swung down to the left in FIGURE 5, so that the bottles lying in the channel can roll down. The lowest of these bottles thereby comes to lie against the levers 40, which are in the position of locking. The locking levers 40' of the channel 51b are swung back into the locking position in the second half of the rotation of the cam 10, while the associated levers 41' remain raised. In the channel 51c, the levers 41" are first swung completely to the left, so that the bottles in that channel can roll down and the lowermost one of them can come to lie against the levers 40" which are still in the locking position. In the second half of the rotary movement of the cams 11 and 12, the levers 41" are again raised into the locking position, and it is only towards the end of the movement of the cam that the levers 40" are swung down and allow the bottles lying on them to drop into the chute 54. The required sequence of the different rocking movements of the different locking levers 40, 40', 40" and 41, 41', 41" so that the levers 41, 41', 41" cannot be swung down until the associated levers 40, 40', 40" have returned to their locking position is ensured by the fact that the associated cams are different from one another in construction or staggered in arrangement.

The next time a coin is inserted, followed by rotation of the hand crank, the locking levers 40, 40', 40" and 41, 41', 41" are returned into the positions indicated on FIGURES 1 and 5 to 10, again in the same sequence. The lowermost bottle of the channel 51a is thereby released into the delivery opening 52. It is seen from this, therefore, that when the mechanism is operated three times by means of the hand crank 36, each time following insertion of a coin, only one bottle is removed from each of the three conveyor channels. In subsequent operations, it is always the lowermost bottle in each channel which will be removed automatically in the same cyclic sequence, so that the three channels will be emptied uniformly.

In order to prevent damage to the locking mechanism when the hand crank 36 is violently rotated before the gear train is released by insertion of a coin, a slipping clutch with adjustable torque is arranged between the hand crank 36 and the toothed driving wheel 39. As shown in FIGURE 4, a short hollow shaft 22 is mounted on the toothed driving wheel 39. This shaft passes through the plate 1a and is rotatably mounted in a bush 23 which is fixed to the plate 1a by means of screws or rivets 24. The stub 22 is provided with separate tapered portions 22a and 22b; the portion 22a, which is near the toothed driving wheel, is hexagonal and the other portion, 22b, is cylindrical. A spring cup washer 25 and a clutch disc 26 which is provided with a corresponding hexagonal aperture are pushed over the hexagonal portion 22a. The other clutch disc 27 is arranged on a coupling nut 28 which is screwed onto a bolt 30 which is rotatable in the hollow stub 22 but cannot be pulled out. The friction by which the two clutch discs 26 and 27 are pressed together by the spring washer 25 can be adjusted by rotating the nut 28 on the bolt 30. When the torque of the coupling has been adjusted, the nut can be secured against rotation on the bolt by means of a pin 29 which passes through a traverse bore in the nut 28 and a longitudinal slot in the threaded portion.

The hand crank 36, which serves to drive the toothed wheel 39 by way of the above-described slipping clutch, is mounted in the door 50a, which can be opened by folding upwards, and when the door is closed the crank is positively connected with the nut 28, for which purpose the portion 28a of the nut which points to the right in FIGURE 4 is provided with an external hexagon. The hand crank 36 is mounted in the door 50a by a sleeve 33 which is fixed in a corresponding opening in the door. The hand crank 36 is fixed by means of a pin 35 to a bearing cylinder 34 which is rotatable in the sleeve 33 and which has an axial bore 34a with internal thread at the end remote from the door. Into this bore is screwed a nut 32 which by means of a peripheral flange secures a sleeve 31 against rotation on the bearing cylinder 34. The portion of the sleeve 31 remote from the bearing cylinder 34 is so constructed that when the door 50a is closed it is positively connected with the hexagonal portion 28a of the coupling nut 28. The nut 32 has an axial bore which serves as a guide for the nut on the tapering portion of the bolt 30. The frictional connection of the clutch discs 26 and 27 is so adjusted that the toothed wheel 39, when not locked, can be rotated by the hand crank 36. When the toothed wheel 39 is locked, however, the clutch disc 27 slips over the immovable coupling disc 26.

The sloping chute 54 indicated in FIGURE 2 for conveying the individual bottles from the channels 51 to the delivery opening 52 is preferably made of rollers the axes of which run at right angles to the direction of movement of the bottles and the external periphery of which is yielding. A chute of this kind, of which two examples are shown in FIGURES 12 to 14, may advantageously also be used in other automatic vending machines.

FIGURE 13 shows the sliding path of rollers 60 in side view. The axes 61 of the rollers lie transversely to the direction of sliding of the bottles in a plane which is determined by the inclination of the delivery channel. In the form of construction shown in FIGURE 12, viewed from the right in FIGURE 13, discs 62 of an elastic material are spaced apart on the axes of the rollers. The discs have in this case all the same diameter, but their diameters may be arranged to diminish from both ends of the shaft 61 towards the center in order to form catch rings to catch the bottles falling down on them yieldingly and noiselessly and then let them slide down slowly to the delivery opening.

FIGURE 14 shows another form of construction of the rollers 60. Two cup members 63 of elastic material are fixed at their closed ends to the ends of the shaft 61 of the roller in such a manner that their open ends face each other. Since the two cup members are more yielding at their open ends, a bottle dropping on to a chute constructed in this way will be caught as if on a channel or groove and conveyed to the delivery opening.

FIGURES 15 and 17 show a construction of the conveyor channels 51a to 51c in which the flat portions may be arranged at a relatively small angle of inclination. At the same time this form of construction ensures that the bottles stored in these sections of the channel will still lie parallel to one another transversely to the direction of travel even when only a small number of bottles are left, in which case there is no longer any pressure exerted by bottles behind them which normally prevents the oblique positioning of the bottles. In the example illustrated, strips 64 along which the bottles roll are disposed along the edges of the perforated sheets 55. These strips have ribs 64a which are of substantially triangular cross-section, the distance between them corresponding to the largest diameter of the bottles 53. The arrangement of the strips 64 relative to the locking means 40, 41, etc., is such that the bottles always lie on the rib surfaces which have the greater inclination to the horizontal, as is shown clearly in FIGURE 15. As a result of this arrangement, even when the channel is only slightly sloping, enabling a reduction in height of the machine, each bottle will always lie on an acutely inclined rolling surface so that when the bottle in front of it is removed it will roll down its path independently of the pressure of the bottles behind it. The ribs 64a at the same time ensure that the bottles will be positioned transversely to the direction of rolling.

The automatic vending machine illutrated in FIGURES 18 and 19 consists of a housing 103 closed by the door 104. In this embodiment bottles 105 are accommodated in three conveyor channels 106 which extend over practically the entire width of the machine and are bent at an angle once or twice along their length. These channels are provided with locking devices (which are not shown in these figures), by means of which the bottles are delivered one by one to a roller device 107 which conveys each bottle to the delivery opening 108 in the door 104. The locking devices are actuated after insertion of a coin by means of a hand crank 109 provided on the outside of the door. The cooling unit which includes an evaporator 110 and a fan 110' produces a circulating cooling current in the machine for cooling the stored bottles 105.

The channels 106 for the bottles 105 have a vertical portion 111, the side walls of which are indicated by the reference numeral 112. In the arrangement shown, the parts 111 are sufficiently wide to accommodate at least two bottles 105 side by side. In the vertical portion 111 of the delivery channel arresting means are provided which are arranged to form a zig-zag guiding channel for the bottles.

In the embodiment of FIGURES 18 and 19 the arresting means are formed by brackets 113 which are fixed to the side walls 112. At each side wall 112 the brackets 113 are arranged at a distance apart from one another which corresponds approximately to twice the diameter of the bottles 105. The brackets are so arranged that those which are disposed on one side wall 112 in a vertical portion of the channel 111 are displaced or staggered relative to those on the opposite wall in the manner shown in FIGURE 18. The brackets 113 each have an inclined supporting and rolling surface 114 for one or more bottles 105, in this case only for one. The rolling surfaces 114 consist of a slightly inclined front portion 114a and a more steeply inclined rear portion 114b. The brackets have a supporting surface 115 on the underside, which slopes down to the associated side wall 112.

The brackets 113 need not extend over the entire length of the bottle. For example, they may consist of two strips or bands of metal, plastic or other material bent in the manner shown in FIGURE 18 and arranged side by side, separated by fixed distances. The ends of these strips may be fixed to the associated side walls 112 which are suitably provided with perforations or the like. The brackets (which have not been separately illustrated in the drawing) are arranged on the associated side walls preferably in the manner shown in FIGURE 19 for the portions 106a of the channel. This ensures a particularly effective circulation of cooling air around the stored bottles.

The brackets shown in the drawing have only been given by way of example, and numerous modifications are possible without deviating from the basic idea of the invention. For example, the vertical portion of the channel or channels may be broad enough to accommodate three or more bottles side by side. In that case, of course, the brackets or the like have to be correspondingly longer, and the slope of the supporting and rolling surface may be broken up into a number of steps. The arresting devices may be in the form of rods, bars or the like extending transversely through the vertical portion of the channel. Synthetic resin or hard rubber may be used for the brackets to protect the bottles. The principal feature, however, is that the arresting devices should provide a zigzag or undulating guiding channel which takes the load off the bottles.

The bottle-vending machine shown in FIGURES 20 to 23 is also provided with three conveyor channels 202 disposed inside the housing 201 and extending practically over the full width of the machine while being bent once or several times. The lower ends of these channels 202 slope towards the delivery opening 204. A pair of locking members 205, 206 are provided at the bottom end of the channels 202, and are actuated by a locking mechanism to be described later. These control the passage of the bottles in such a way that the lowermost bottles of the individual channels are released in a definite cyclic sequence to the delivery opening.

The channels 202 are separated from one another by narrow partitions 207, 208 on which arresting devices 209 in the form of narrow substantially semicircular conveyor strips are provided. As the strips 209 and the partitions 207 and 208 are relatively narrow and do not extend over the entire width of the conveyor paths 202, they permit practically unhindered circulation of the cooling air. The conveyor strips 209 may be formed in one piece with the partitions 207 and 208, for example in the form of strips of plastic of suitable cross-section which are fixed to the front and rear walls of the housing which enclose the conveyor channels 202.

The cooling device for cooling the stored bottles consists essentially of the evaporator 210, a fan 211 arranged below it, and a compressor 212 with heat exchanger at the bottom of the machine. The evaporator 210 and the fan 211 are so arranged that the cool air produced by the fan first impinges on the bottles 203 at the bottom end of the channels 202; this ensures that the bottles lying nearest the delivery opening 204 will in any case be rapidly and effectively cooled even after refilling of the machine.

The locking members 205, 206 controlling the travel of the bottles are disposed above the channels 202 and project into these channels from above. The locking member 205, 206, which, as shown in FIGURE 23, are in the form of pivoting flaps, are fixed to rocking shafts 213, 214 which are mounted in the front wall 215 and the rear wall 216 of the housing. A control lever 217 bearing against the guiding peripheral surface of a control disc 219 is fixed to the rocking shafts 214 which carry the locking members 206. The control surface 218 of the control disc 219 is provided with a flattened portion 220 which extends over approximately 120°. The control lever 217 which is under the action of the leaf spring 221 can therefore swing anticlockwise in the appropriate position of rotary adjustment of the control disc 219, that is to say it can bear against the flattened portion 220, as is the case with the control disc 219' and the control disc 219" respectively, associated with levers 217', 217". The locking member 206 is thereby swung upwardly so that the bottle which has till now been retained by it is released and reaches the sliding surface 222 of the delivery opening 214. The control discs 219, 219', 219" are provided with peripheral teeth 223 which project over the control surface 218 and through which they maintain direct relative engagement. As the control discs 219, 219', 219" are similar in construction and are arranged with their flattened portions 220 displaced by 120° from one another, the locking levers 206 are carried to their highest position in cyclic order, after each switching step of 120°, so that the bottles lying in front in each case, which will be the lowermost ones in the various conveyor channels, will be released in succession in a cyclic sequence. The locking members 205 which control the movement of the bottles following the one which has just been discharged and which are fixed to the rocking shafts 213 are in driving connection with the control discs 219, 219′, 219″ of the locking mechanism by means of a linkage consisting of the levers 224, 225. For this purpose, eccentric pins 226, to which the linkages 225 are connected, are provided on the control discs 219, 219′, 219″, the pins 226 being angularly displaced by 120° from one another. In this manner, the locking members 205 are automatically controlled by the control discs 219 of the locking mechanism in such a manner that the locking members 205 will be in the lowest position, which is the locking position preventing the movement of the bottles, only when the associated locking member 206 is in the open position (see control disc 219′ in FIGURE 21). In the case of the top of FIGURE 21, the locking member 205 takes up an intermediate position in which the following bottles are not quite released but allowed to move on for just a short distance. The bottle in front of the locking member 205 can only begin its full movement down along the channel when the locking member 205 has reached the switching position (see locking member 205″) shown in the middle of FIGURE 21. This prevents the bottles from moving forward in jerks and ensures that they will move on smoothly at a uniform rate.

Figure 20:
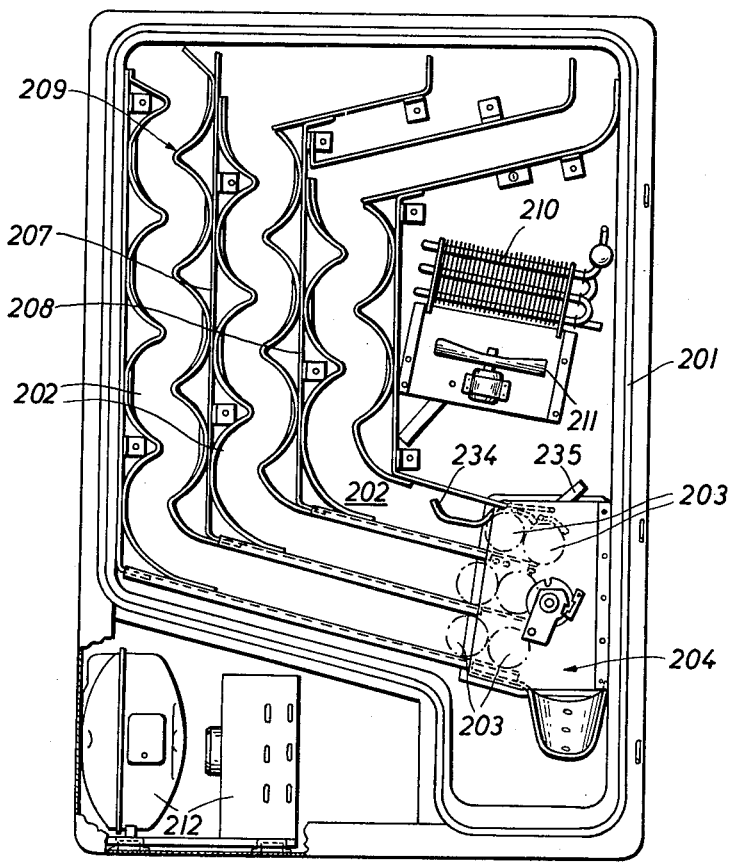
FIGURE 20 shows a further alternative vending machine according to the invention in longitudinal section in front view.

The drive for the locking mechanism, consisting of the control discs 219, 219′, 219″, is effected preferably by means of a ratchet coupling which consists of the slotted disc 227 situated on the central control disc 219″ and the slotted plates 228, 229 disposed on either side. The plates 228, 229 may be swung through 120° by the driving means 230 (FIGURE 22), whereby the slotted disc 227 is also turned through 120° by the ratchet pawl 231. The recesses 232 provided in the slotted disc 227, which are displaced from one another by 120°, serve to engage a locking detent 233 which prevents reverse angular movement of the slotted disc 227 and locks this disc as well as the locking gear train associated with it in the individual switching positions. The sensing lever 234 at the top of the locking mechanism projects into the inner conveyor channel 202 and serves to detect the extent to which the machine is filled. As soon as the inner channel 202 is sufficiently empty, the lever 234 swings downwards (FIGURE 20). The rocking lever 235 rigidly connected with the sensing lever 234 is thereby swung upwardly, indicating that the vending machine is empty.

I claim:

1. In an automatic vending machine having a housing with a bottom opening for dispensing bottles stacked in said housing, in combination, a cooling unit in said housing located at a level above said opening, strip means positioned with lateral clearance in said housing and forming at least one looped downwardly sloping track for said bottles extending toward said opening and enveloping said cooling unit on three sides in a vertical plane, circulation means for directing cold air from said cooling unit toward the bottom end of said track adjacent said opening, and releasable stop means for said bottles at the bottom end of said track adapted to permit the passage of one bottle at a time through said opening, said strip means being provided with a downwardly sloping terminal portion for supporting the lowermost bottles ahead of said stop means, said terminal portion having a profiled surface with substantially horizontal portions and downwardly inclined portions alternating along the track, said stop means being positioned to maintain said lowermost bottles poised on said downwardly inclined portions between successive passages of bottles through said opening.

2. In an automatic vending machine having a housing with a bottom opening for dispensing generally cylindrical articles stacked in said housing, in combination, supporting means for said articles in said housing forming a track descending toward said opening, and releasable stop means for said articles at the bottom of said track adapted to permit the passage of one article at a time through said opening, said supporting means being provided with a downwardly sloping terminal portion for supporting the lowermost articles ahead of said stop means, said terminal portion having a profiled surface with substantially horizontal portions and downwardly inclined portions alternating along the track, said stop means being positioned to maintain said lowermost articles poised on said downwardly inclined portions between successive passages of articles through said opening.

3. In an automatic vending machine having a housing with a bottom opening for dispensing generally cylindrical articles stacked in said housing, in combination, supporting means for said articles in said housing forming a plurality of parallel tracks descending toward said opening, and releasable stop means for said articles at the bottom of said tracks cyclically operable to permit the passage of one article at a time from a respective track through said opening, said supporting means being provided at the bottom of each track with a downwardly sloping terminal portion for supporting the lowermost articles ahead of said stop means, said terminal portion having a profiled surface with substantially horizontal portions and downwardly inclined portions alternating along the track, said stop means being positioned to maintain said lowermost articles poised on said downwardly inclined portions between successive passages of articles through said opening.

References Cited in the file of this patent

UNITED STATES PATENTS

| | | |
|---|---|---|
| 474,357 | Boldt | May 10, 1892 |
| 1,633,675 | Oliver | June 28, 1927 |
| 1,803,146 | Robbins | Apr. 28, 1931 |
| 1,981,272 | Kuhn | Nov. 20, 1934 |
| 2,005,092 | Kuhn | June 18, 1935 |
| 2,100,423 | Zeigler | Nov. 30, 1937 |
| 2,136,089 | Stone | Nov. 8, 1938 |
| 2,493,223 | Brock | Jan. 3, 1950 |
| 2,531,347 | Voigtritter | Nov. 21, 1950 |
| 2,576,874 | Acton | Nov. 27, 1951 |
| 2,610,100 | Childers | Sept. 9, 1952 |
| 2,831,419 | Timm | Apr. 22, 1958 |
| 2,878,961 | Voorhees | Mar. 24, 1959 |
| 2,918,196 | Le Bron | Dec. 22, 1959 |